US008621288B2

(12) United States Patent  
Igarashi

(10) Patent No.: US 8,621,288 B2  
(45) Date of Patent: Dec. 31, 2013

(54) MANAGEMENT APPARATUS, METHOD FOR CONTROLLING SAME, AND STORAGE MEDIUM FOR SAME

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/232,336

(22) Filed: Sep. 14, 2011

(65) Prior Publication Data

US 2012/0084606 A1    Apr. 5, 2012

(30) Foreign Application Priority Data

Oct. 5, 2010   (JP) ................................. 2010-226006

(51) Int. Cl.  
*G06F 11/00* (2006.01)

(52) U.S. Cl.  
USPC ........................................................... 714/57

(58) Field of Classification Search  
USPC ............................................. 714/37, 48, 57  
See application file for complete search history.

(56) References Cited

U.S. PATENT DOCUMENTS

| | | | |
|---|---|---|---|
| 6,920,568 B2 | 7/2005 | Igarashi | |
| 2002/0191215 A1* | 12/2002 | Watanabe | 358/1.15 |
| 2003/0229691 A1* | 12/2003 | Ishimoto | 709/223 |
| 2004/0133553 A1* | 7/2004 | Suto | 707/1 |
| 2005/0091484 A1* | 4/2005 | Thornton et al. | 713/156 |
| 2005/0182969 A1* | 8/2005 | Ginter et al. | 713/201 |
| 2005/0235344 A1 | 10/2005 | Igarashi | |
| 2009/0195806 A1* | 8/2009 | Ohashi | 358/1.13 |
| 2009/0240990 A1* | 9/2009 | Gollub et al. | 714/45 |
| 2010/0293411 A1* | 11/2010 | Yokoyama | 714/10 |
| 2011/0172961 A1* | 7/2011 | Sunata | 702/179 |
| 2012/0017126 A1* | 1/2012 | Yamano | 714/48 |

FOREIGN PATENT DOCUMENTS

JP          2003-15973 A      1/2003

* cited by examiner

*Primary Examiner* — Yair Leibovich  
(74) *Attorney, Agent, or Firm* — Fitzpatrick, Cella, Harper & Scinto

(57) ABSTRACT

A device management apparatus acquires the state of a device (image forming apparatus), and determines whether or not an error occurring in the image forming apparatus is the already-occurred error based on the change in the state of the image forming apparatus. When the error occurring in the image forming apparatus is an already-occurred error, the device management apparatus determines whether or not the error continues for a period of time equal to or longer than a predetermined period of time. When the error continues for a period of time equal to or longer than a predetermined period of time, the device management apparatus changes an error notification destination, and retransmits an electronic mail regarding the error to the changed notification destination.

9 Claims, 13 Drawing Sheets

| Device name | Serial number | IP address | MAC address | Product name |
|---|---|---|---|---|
| Device 1 | ABC123 | 10.168.16.101 | 000085E0001 | Printer A1 |
| Device 2 | DEF456 | 10.168.16.102 | 000085E0002 | MFP B1 |
| Device 3 | GHI789 | 10.168.16.103 | 000085E0003 | MFP B1 |
| Device 4 | JKL123 | 10.168.16.104 | 000085E0004 | Printer C1 |

Monitoring target device

ABC123, DEF456, GHI789, JKL123

820 —

Monitoring time

8:30　~　17:00

830 —

Monitoring target error type

☒ Paper error　　☒ Jam　　☐ Toner error
☒ Paper-feeding unit error　　☐ Paper-discharging unit error　　☐ Cover open Electronic mail transmission condition ☒ When an error occurs　　☒ When recovered from an error
☒ When an error state changes

840 —

850 —

Electronic mail retransmission setting

☒ An electronic mail is retransmitted when not recovered from an error for a predetermined period of time

860 —

Electronic mail retransmission interval

Warning level　6 hour　　Eerror level　3 hour
Service call error level　1 hour

870 —

Electronic mail transmission destination

First priority　aaa@xxx.com
Second priority　bbb@xxx.com
Third priority　ccc@xxx.com OK　Cancel 880　890

FIG. 8A

| Device key | Error ID | Monitoring time |
|---|---|---|
| ABC123 | ID-0002 | 20xx/01/01 15:00 |
| JKL123 | ID-0100 | |

FIG. 8B

| Device key | Error ID | Error occurred time | Error finally detected time | Error recovered time | The number of error mail transmission times 1106 | Transmitted mail Message-ID | Transmitted mail References |
|---|---|---|---|---|---|---|---|
| ABC123 | ID-0001 | 20xx/01/01 12:00 | 20xx/01/01 14:00 | 20xx/01/01 15:00 | 1 | MM | LL |
| DEF456 | ID-0010 | 20xx/01/01 12:00 | 20xx/01/01 12:00 | 20xx/01/01 13:00 | 1 | PP | OO |
| ABC123 | ID-0002 | 20xx/01/01 15:00 | 20xx/01/01 15:00 | | 1 | NN | LL |
| JKL123 | ID-0100 | 20xx/01/01 12:00 | 20xx/01/01 15:00 | | 2 | RR | QQ |

FIG. 10

| Error ID | Error category | Error level | Error message | Recovery message |
|---|---|---|---|---|
| ID-0001 | Toner | Warning | The amount of toner is low. | Toner warning has been recovered. |
| ID-0002 | Toner | Error | No toner is left. | Toner error has been recovered. |
| ID-0010 | Paper | Warning | The amount of sheets is low. | Paper warning has been recovered. |
| ID-0100 | Cover open | Error | Front cover is open. | Cover open error has been recovered. |
| ID-0200 | Jam | Error | Paper is jammed. | Jam error has been recovered. |
| ID-1000 | Service call | Service call Error | Service call error has occurred. | Service call error has been recovered. |

MANAGEMENT APPARATUS, METHOD FOR CONTROLLING SAME, AND STORAGE MEDIUM FOR SAME

BACKGROUND OF THE INVENTION

1. Field of the Invention

The present invention relates to a management apparatus, a method for controlling the same, and a storage medium for the same.

2. Description of the Related Art

Apparatuses that monitor the state of a network device connected to a network have been proposed. For example, Japanese Patent Laid-Open No. 2003-15973 discloses a network device management apparatus that acquires the state of a network device at regular intervals, and, when the apparatus detects that the state of a network device has changed, reports the state change to a predetermined notification destination using an electronic mail. When a new error has occurred, the network device management apparatus reports the occurrence of an error to a notification destination using an electronic mail. Also, when a network device has recovered from an error, the network device management apparatus reports the recovery from the error to a notification destination using an electronic mail.

By applying the network device management apparatus disclosed in Japanese Patent Laid-Open No. 2003-15973 to the management of an image forming apparatus connected to a network, the network device management apparatus may report the occurrence of an error in the image forming apparatus or the like to a network administrator using an electronic mail.

However, the network device management apparatus disclosed in Japanese Patent Laid-Open No. 2003-15973 transmits an electronic mail to a notification destination only when the apparatus detects the change in the state of a network device(s). In other words, the number of times that the network device management apparatus reports an electronic mail regarding an error that has occurred in a network device is only once, and thus, the apparatus does not retransmit an electronic mail regarding the error with the notification destination being changed.

Therefore, when the network device management apparatus disclosed in Japanese Patent Laid-Open No. 2003-15973 is applied to the management of an image forming apparatus, the following situations occur. In other words, if a receiver (network administrator or the like) of the electronic mail fails to see the electronic mail, the error that has occurred in the image forming apparatus will not be recognized by the electronic mail receiver, and thus, the error may be overlooked for a long time.

Also, since the network device management apparatus does not retransmit an electronic mail regarding an error with the notification destination being changed, the apparatus may not report the recovery from an error to each notification destination to which an electronic mail regarding the error has been reported upon recovery from the error.

SUMMARY OF THE INVENTION

The management apparatus of the present invention is an apparatus that, when an error occurs in an image forming apparatus, reports information regarding the error to a desired notification destination such that the error that has occurred in the image forming apparatus is not overlooked.

According to an aspect of the present invention, a management apparatus that monitors a plurality of image forming apparatuses on a network is provided. The management apparatus includes a state acquisition unit configured to acquire the state of the image forming apparatus; a monitoring unit configured to monitor the change in the state of the image forming apparatus based on the acquired state of the image forming apparatus; a determination unit configured to determine a notification destination to which the change in the state is to be reported depending on the monitor result of the change in the state of the image forming apparatus by means of the monitoring unit; and a transmission unit configured to transmit a notification regarding the change in the state to the notification destination determined by the determination unit. The monitoring unit further includes an error occurrence determination unit configured to determine whether an error occurring in the image forming apparatus is an already-occurred error or a newly-occurred error based on the state of the image forming apparatus acquired by the state acquisition unit; an error continuation time determination unit configured to determine whether or not the occurring error continues for a period of time equal to or longer than a predetermined period of time when the error occurrence determination unit has determined that the occurring error is the already-occurred error; and an error recovery determination unit configured to determine whether or not the image forming apparatus has recovered from an error that occurred therein based on the state of the image forming apparatus acquired by the state acquisition unit. As the notification destination when the error continuation time determination unit has determined that the occurring error continues for a period of time equal to or longer than a predetermined period of time, the determination unit newly determines a notification destination that is different from the notification destination when the error occurrence determination unit has determined that the error is a newly-occurred error. When the error continuation time determination unit has determined that the occurring error continues for a period of time equal to or longer than a predetermined period of time, the transmission unit transmits a notification regarding the error to the notification destination determined by the determination unit. As the notification destination when the error recovery determination unit has determined that the image forming apparatus has recovered from an error that occurred therein, the determination unit determines a notification destination to which a notification regarding the error that has occurred has been transmitted. When the error recovery determination unit has determined that the image forming apparatus has recovered from an error, the transmission unit transmits a notification regarding the recovery from the error to the notification destination determined by the determination unit.

Further features of the present invention will become apparent from the following description of exemplary embodiments with reference to the attached drawings.

BRIEF DESCRIPTION OF THE DRAWINGS

FIG. 6 is a diagram illustrating an example of a monitoring condition generation screen.

FIG. 8A is a diagram illustrating an example of state information.

FIG. 8B is a diagram illustrating an example of a device state list.

FIG. 10 is a diagram illustrating an example of an error message list.

DESCRIPTION OF THE EMBODIMENTS

Figure 1:
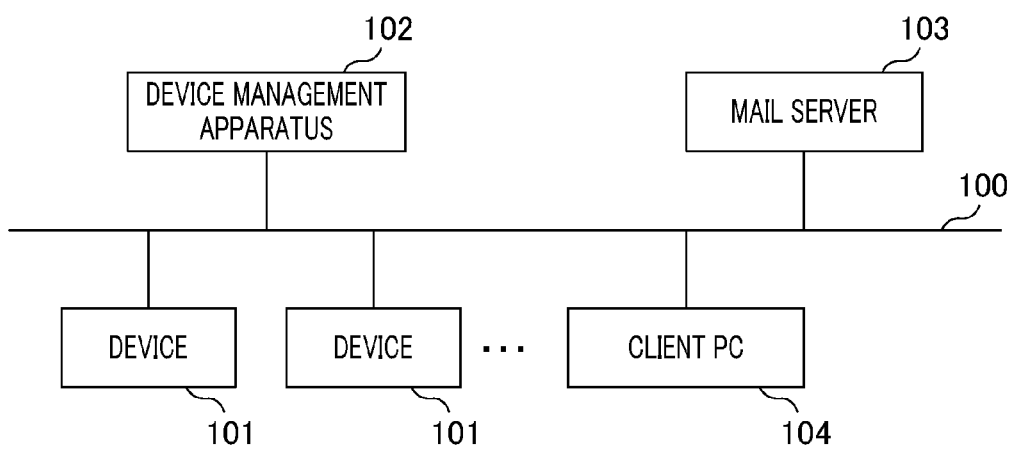
FIG. 1 is a diagram illustrating an example of the system configuration of the present embodiment.

FIG. 1 is a diagram illustrating an example of the system configuration of the present embodiment. The system shown in FIG. 1 includes a device 101, a device management apparatus 102, a mail server 103, and a client PC (Personal Computer) 104. The device 101, the device management apparatus 102, the electronic mail server 103, and the client PC 104 communicate to each other via a network 100. The network 100 is, for example, the Internet. The network 100 may be LAN (Local Area Network) or the like.

The system shown in FIG. 1 includes one or a plurality of devices 101. The device 101 is an information processing device to be managed by the device management apparatus 102. In the present embodiment, the device 101 is an image forming apparatus (e.g., multi-function peripheral).

The device management apparatus 102 is the management apparatus of the present embodiment. The device management apparatus 102 monitors the device 101 on a network. More specifically, the device management apparatus 102 acquires the state of the device 101 from the device 101, and monitors the change in the acquired state of the device 101. Then, the device management apparatus 102 transmits an electronic mail regarding the change in the state to the state-change notification destination depending on the monitor result of the change in the state of the device 101. The notification destination is, for example, a network administrator. The device management apparatus 102 transmits the electronic mail to the notification destination via the electronic mail server 103.

The electronic mail server 103 receives an electronic mail that has been transmitted from the device management apparatus 102, and transfers the electronic mail to the specified transmission destination (state-change notification destination). Note that SMTP (Simple Mail Transfer Protocol) or POP3 (Post Office Protocol Version 3) is generally employed for electronic mail transfer, but the present invention is not limited to these protocols. The client PC 104 has a function for receiving an electronic mail from the electronic mail server 103. The client PC 104 is, for example, a PC that is operated by a network administrator, and the network administrator can view the content of the electronic mail received by the client PC 104.

Figure 2A:
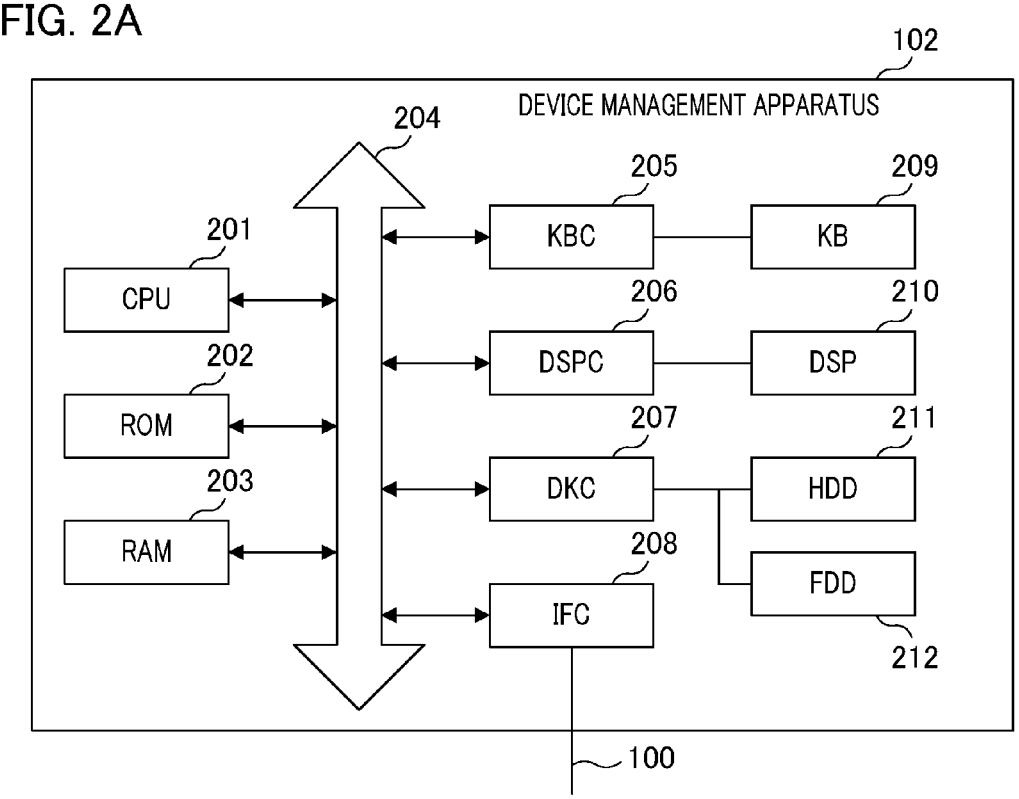
FIG. 2A is a diagram illustrating an example of the hardware configuration of a device management apparatus.
Figure 2B:
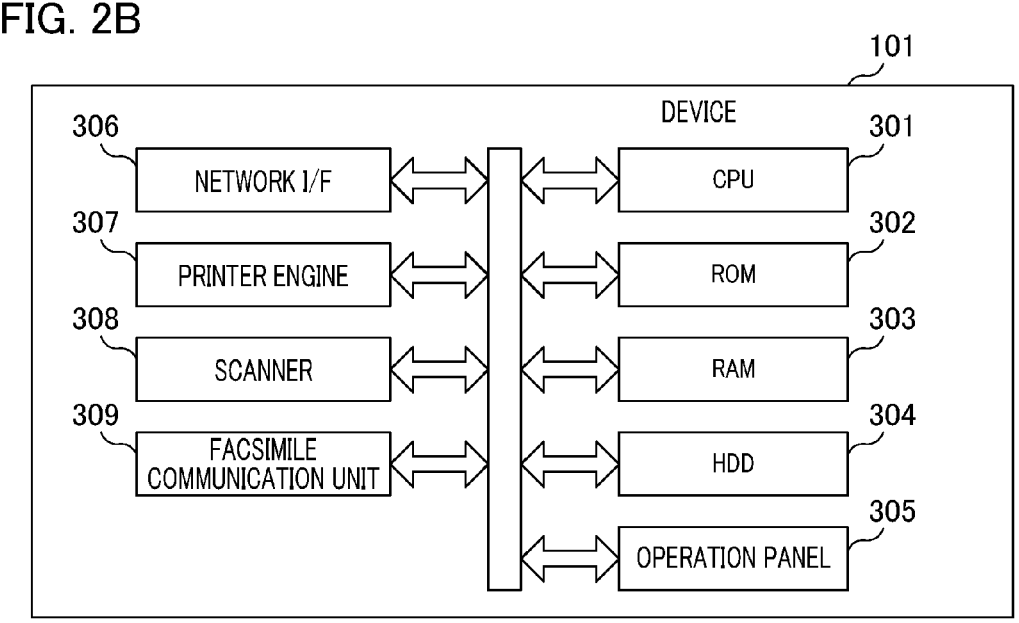
FIG. 2B is a diagram illustrating an example of the hardware configuration of a device.

FIG. 2A and FIG. 2B are diagrams illustrating examples of the hardware configurations of a device management apparatus and a device, respectively. FIG. 2A is a diagram illustrating an example of the hardware configuration of a device management apparatus. The device management apparatus 102 includes a CPU 201, ROM 202, and RAM 203, where CPU is an abbreviation for Central Processing Unit, ROM is an abbreviation for Read Only Memory, and RAM is an abbreviation for Random Access Memory.

Also, the device management apparatus 102 includes a keyboard controller (KBC) 205, a display controller (DSPC) 206, and a disk controller (DKC) 207. Furthermore, the device management apparatus 102 includes an interface controller (IFC) 208, a keyboard (KB) 209, a display (DSP) 210, a hard disk drive (HDD) 211, and a floppy (registered trademark) disk drive (FDD) 212.

The CPU 201 controls the device management apparatus 102 overall. More specifically, the CPU 201 reads a computer program (hereinafter referred to as "device management program") that controls the device management apparatus 102 from the HDD 211 and executes it. The ROM 202 stores a BIOS or a boot program in advance. The RAM 203 functions as a main memory of the CPU 201, a working area, or the like. The KBC 205 controls the input of instructions from the KB 209, a pointing device (not shown), or the like. The DSPC 206 controls information display processing performed by the DSP 210.

The DKC 207 controls access to a storage device such as the HDD 211, the FDD 212, or a CD-ROM (not shown). Each of the HDD 211 and the FDD 212 stores a boot program, an operating system (OS), database, a device management program, data thereof, and the like in advance. The IFC 208 transmits/receives information to/from other network equipment via the network 100. The CPU 201 to the IFC 208 are arranged on a system bus 204.

In the present embodiment, the OS is, for example, Windows (registered trademark) manufactured by Microsoft Corporation, but is not limited thereto. Also, the device management program may be stored in a storage medium such as a floppy (registered trademark) disk, a CD-ROM, or the like in advance. The device management program may be read out from a floppy (registered trademark) disk or a CD-ROM so as to be installed in the HDD 211.

Note that the hardware configuration of each of the client PC 104 and the electronic mail server 103 is the same as that of the device management apparatus 102 shown in FIG. 2A. The HDD 211 provided in the electronic mail server 103 stores mail software such as SMTP, POP3, or the like in advance.

FIG. 2B is a diagram illustrating an example of the hardware configuration of a device. In FIG. 2B, a description will be given by taking an example of the hardware configuration of an image forming apparatus. The device (image forming apparatus) 101 includes a CPU 301, ROM 302, RAM 303, a HDD 304, an operation panel 305, a network I/F 306, a printer engine 307, a scanner 308, and a facsimile communication unit 309.

The CPU 301 controls the device 101 overall. The ROM 302 stores a print processing program executed by the CPU 301 and font data in advance. The RAM 303 functions as a working area of the CPU 301, a reception buffer, and an image drawing area. When an error occurs in the device 101, the CPU 301, which has detected the error, stores the list of occurring errors in the RAM 303.

The HDD 304 stores image data or the like. The CPU 301 stores information specific to a device, such as the IP (Internet Protocol) address, the product name, and the serial number of the device 101. The operation panel 305 includes various switches, buttons, and a liquid crystal display unit for displaying messages. The network I/F 306 is an interface that connects the device 101 to the network 100. More specifically, the network I/F 306 controls communication between the device 101 and the device management apparatus 102. Also, the network I/F 306 controls communication between the device 101 and the electronic mail server 103. The printer engine 307 controls print processing on recording paper. The scanner 308 performs original readout processing. The communication unit 309 performs the transmission/reception of facsimile data.

Figure 3:
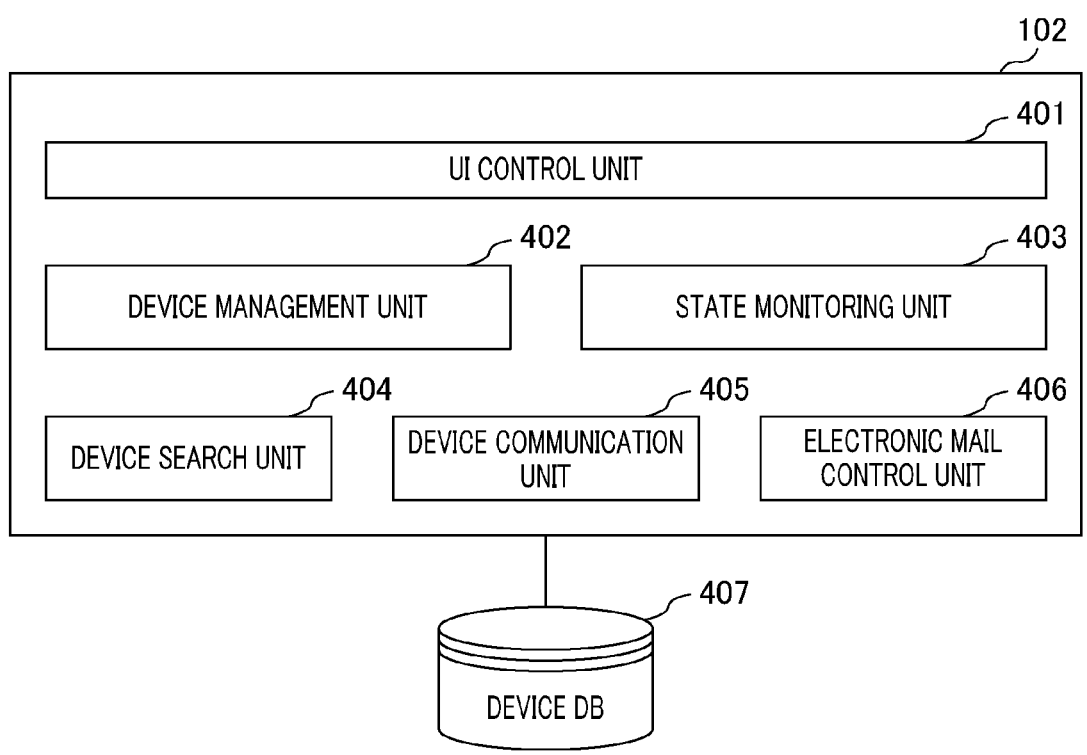
FIG. 3 is a functional block diagram illustrating an example of a device management apparatus.

FIG. 3 is a functional block diagram illustrating an example of a device management apparatus. The device management apparatus 102 includes a UI (User Interface) control unit 401, a device management unit 402, a state monitoring unit 403, a device search unit 404, and a device communication unit 405. Further, the device management apparatus 102 includes an electronic mail control unit 406, and a device database (DB) 407. A method for controlling the management apparatus of the present embodiment is realized by the functions of the processing units provided in the device management apparatus 102 shown in FIG. 3. More specifically, the functions of the processing units provided in the device management apparatus 102 are realized by the CPU 201 (FIG. 2A) executing the device management program stored in the HDD 211.

The UI control unit 401 provides a graphical user interface (GUI) that is used by a user of the device management apparatus 102 to operate the device management apparatus 102. The GUI is displayed on a display (DSP) 210 provided in the device management apparatus 102. The GUI may be a Web application that is available from the client PC 104 using an HTTP protocol.

The device management unit 402 searches the device 101 connected to a network via the device search unit 404. The device search unit 404 searches the device 101 in accordance with the instruction given by the device management unit 402. The device search unit 404 searches the device 101 by transmitting a search request packet such as SLP, SNMP, or the like, where SLP is an abbreviation for Service Location Protocol, and SNMP is an abbreviation for Simple Network Management Protocol.

The device management unit 402 temporarily stores the IP address and the MAC (Media Access Control) address of the searched device 101 as device search information in the RAM 203 or the HDD 211. The device management unit 402 acquires device detail information about the searched device 101 via the device communication unit 405. Device detail information includes, for example, the model name, the serial number, the capability, and the like of the device 101. The device communication unit 405 acquires device detail information in accordance with the instruction given by the device management unit 402, and passes it to the device management unit 402.

The device management unit 402 associates information for uniquely identifying a device (e.g., serial number, IP address, and MAC address) with device detail information, and stores the resulting information as a device list in the device DB 407. The information for uniquely identifying a device is a key for extracting individual information from the device list. Hereinafter, the key is referred to as a "device key".

The state monitoring unit 403 functions as a state acquisition unit configured to acquire the state of the device 101. More specifically, the device management unit 402 acquires information indicating the state of the device 101 (hereinafter referred to as "state information") via the device communication unit 405. The device 101 about which the state information is to be acquired is the device 101 that corresponds to each device key included in the device list. In the present embodiment, the state monitoring unit 403 acquires state information using SNMP. The state monitoring unit 403 may also acquire state information using a protocol other than SNMP. The state monitoring unit 403 associates the acquired state information with a device key, and stores the resulting information as a device state list in the device DB 407.

Also, the state monitoring unit 403 functions as a monitoring unit configured to monitor the change in the state of the device 101. More specifically, the state monitoring unit 403 determines whether or not an error has occurred in the device 101 based on the state information and the device state list. Further, the state monitoring unit 403 determines whether or not the device 101 has recovered from the error that occurred therein based on the state information and the device state list.

The state monitoring unit 403 functions as a determination unit configured to determine a notification destination to which the change in the state is to be reported depending on the monitor result of the change in the state of the device 101. The state monitoring unit 403 transmits an electronic mail regarding the change in the state to the state-change notification destination via the electronic mail control unit 406 and the electronic mail server 103. The electronic mail control unit 406 functions as a transmission unit configured to transmit an electronic mail regarding the change in the state to the notification destination determined by the state monitoring unit 403 in accordance with the instruction given by the state monitoring unit 403. The device DB 407 is a storage unit configured to store a device list and a device state list. Also, the device DB 407 stores the monitoring condition specified on the monitoring condition generation screen shown in FIG. 6 and the message list to be described with reference to FIG. 10.

Figures 4A, 4B:
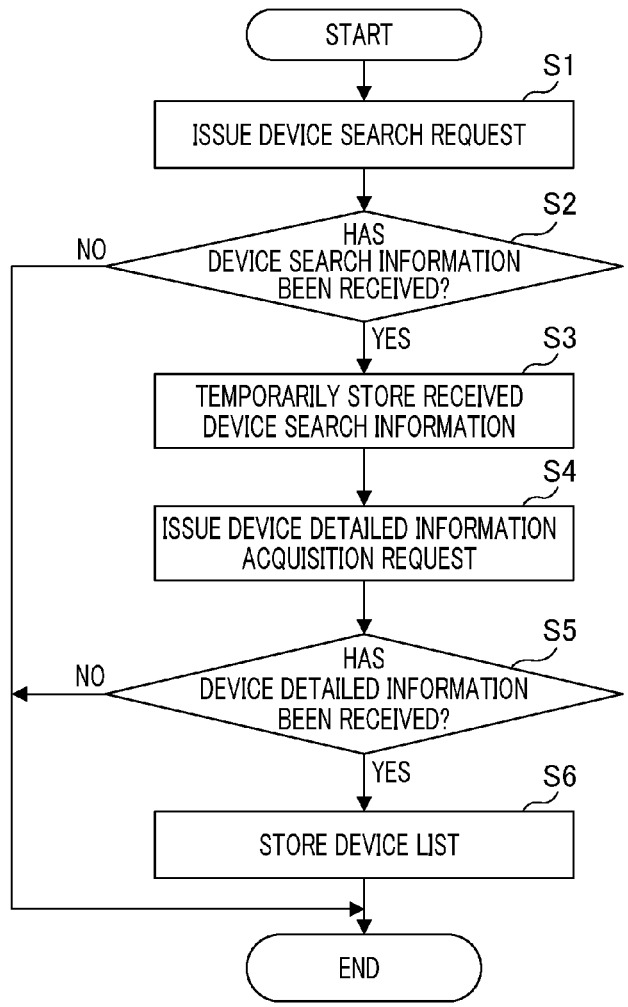
FIG. 4A is a flowchart illustrating device detail information acquisition processing.
FIG. 4B is a diagram illustrating an example of a device list.

FIG. 4A and FIG. 4B are diagrams illustrating device detail information acquisition processing. FIG. 4A is a flowchart illustrating device detail information acquisition processing. For example, when a user selects a menu for acquiring device detail information using a GUI provided by the UI control unit 401 of the device management apparatus 102, the UI control unit 401 activates the device management unit 402. With this arrangement, the device detail information acquisition processing shown in the present flowchart is started.

Firstly, when the device management unit 402 receives a device search instruction from a user via the UI control unit 401, the device management unit 402 instructs the device search unit 404 to search the device 101. More specifically, the device search unit 404 issues a device search request to various devices on the network 100 (step S1). The device search request is a request for transmitting device search information to various devices on the network 100. In this example, device search information is the IP address and the MAC address of the device 101.

Next, the device search unit 404 determines whether or not a response, i.e., device search information, has been received from the device 101 (step S2). When the device search unit 404 has not received device search information from the device 101, the process is ended. When the device search unit 404 has received device search information from the device 101, the device management unit 402 receives device search information from the device search unit 404. Then, the device management unit 402 temporarily stores device search information in the RAM 203 or the HDD 211 (step S3).

Next, the device management unit 402 makes a request for issuing a device detail information acquisition request to the device communication unit 405, and the device communication unit 405 issues a device detail information acquisition request (step S4). The device detail information acquisition request is a request for transmitting device detail information to the device 101. The device management unit 402 receives the response result for a device detail information acquisition request, i.e., device detail information, via the device communication unit 405. The device management unit 402 determines whether or not device detail information has been received (step S5).

When the device management unit 402 has not received device detail information, the process is ended. When the device management unit 402 has received device detail information, the device management unit 402 associates the received device detail information with a device key, and stores the resulting information as a device list in the device DB 407 (step S6).

FIG. 4B is a diagram illustrating an example of a device list. The device list has data items such as device name, serial number, IP address, MAC address, and product name. The device name is the name of the device 101. The serial number is the serial number of the device 101. The IP address is the IP address of the device 101. The MAC address is the MAC address of the device 101. The product name is the product name of the device 101. Note that the device list may include information such as a place where the device 101 is installed or the like. In the following description, a serial number is referred to as a "device key".

Figure 5:
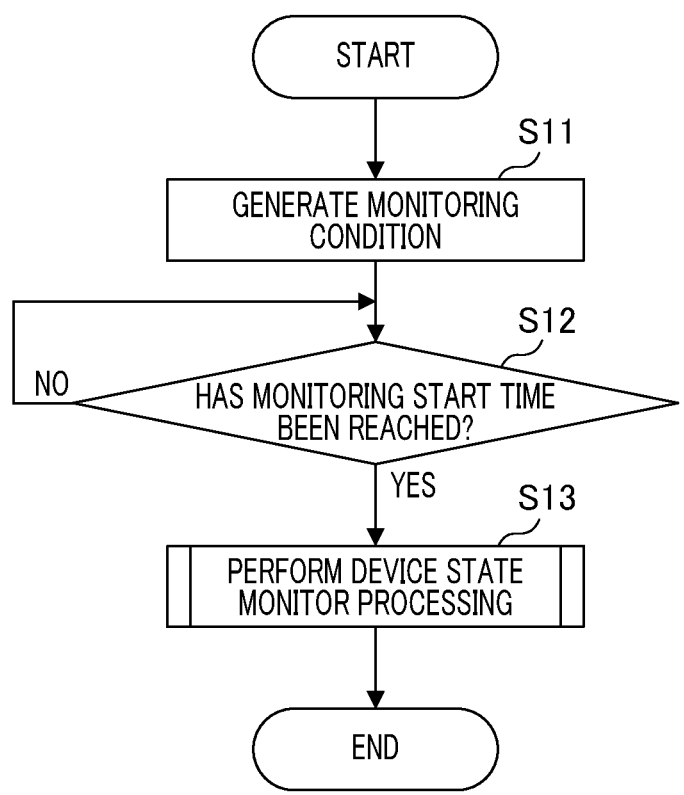
FIG. 5 is a flowchart illustrating device state monitor processing.

FIG. 5 is a flowchart illustrating device state monitor processing. For example, when a user selects a menu for monitoring a device using a GUI provided by the UI control unit 401 of the device management apparatus 102, the UI control unit 401 activates the device management unit 402. With this arrangement, the device state change monitor processing shown in the present flowchart is started.

Firstly, the UI control unit 401 provides a monitoring condition generation screen to a user. The monitoring condition is a condition regarding device monitoring. The UI control unit 401 generates the monitoring condition in accordance with a user's operation on the monitoring condition generation screen (step S11). The UI control unit 401 passes the generated monitoring condition to a device monitoring unit 403. The device monitoring unit 403 stores the monitoring condition received from the UI control unit 401 in the device DB 407.

FIG. 6 is a diagram illustrating an example of a monitoring condition generation screen. The monitoring target device 810 is the setting item for specifying a monitoring target device. A user may specify one or a plurality of devices from devices corresponding to device keys included in the device list. In this example, although a user specifies a monitoring target device by inputting a device serial number into a text box, a user may also specify a monitoring target device by using other methods.

A monitoring time 820 is a setting item that specifies the time for executing device-state monitoring. A monitoring target error type 830 is a setting item that specifies the type (error category) of an error to be detected by device state monitor processing. An electronic mail transmission condition 840 is a setting item that specifies a condition for transmitting an electronic mail to a device state-change notification destination. In this example, as a condition for transmitting an electronic mail, the type of the change in the state of the device 101 may be specified.

When a user puts a check mark in the check box corresponding to "when an error occurs", the condition for which an electronic mail is transmitted upon occurrence of an error in the device 101 is specified. When a user puts a check mark in the check box corresponding to "when recovered from an error", the condition for which an electronic mail is transmitted upon recovery from an error in the device 101 is specified. Also, a user puts a check mark in the check box corresponding to "when an error state changes", the condition for which an electronic mail is transmitted upon change in the state of an error in the device 101 is specified.

An electronic mail retransmission setting 850 is a setting item that specifies whether or not an electronic mail is retransmitted. By making a user put a check mark in the check box corresponding to the electronic mail retransmission setting 850, the retransmission of an electronic mail is specified when recovery from an error has not occurred for a predetermined period of time. In the example shown in FIG. 6, the electronic mail retransmission setting 850 is a setting item that specifies whether or not an electronic mail for all errors is uniformly retransmitted. The electronic mail retransmission setting 850 may be a setting item that is capable of setting the propriety of the execution of the retransmission of an electronic mail for each error category and each error level.

An electronic mail retransmission interval 860 is a setting item that specifies the time interval for retransmitting an electronic mail. When an error still continues in the device 101 even if the time specified by the present setting item has elapsed after the occurrence of an error, the state monitoring unit 403 retransmits an electronic mail. A user may set an electronic mail retransmission interval for each error level, such as a warning level error, an operator call error, or a service call error.

An electronic mail transmission destination 870 is a setting item that specifies the transmission destination of an electronic mail to be transmitted, i.e., device state-change notification destination, when the state monitoring unit 403 detects a changed state of a device. When the state monitoring unit 403 firstly detects a device error, the state monitoring unit 403 transmits an electronic mail to the notification destination specified as "first priority". When an electronic mail retransmission interval has elapsed after the transmission of the electronic mail, the state monitoring unit 403 transmits the electronic mail to the notification destination specified as "second priority". Thereafter, after each electronic mail retransmission interval has elapsed, the state monitoring unit 403 transmits an electronic mail to the notification destination having a priority level that is one level lower. In other words, the state monitoring unit 403 sequentially transmits an electronic mail to the notification destinations specified as "third priority", "fourth priority", . . . , and "Nth priority". After each electronic mail retransmission interval has elapsed, the state monitoring unit 403 may transmit an electronic mail to the notification destination to which an electronic mail has already been transmitted and the notification destination to which a current error is to be reported.

When a user pushes an OK button 880, the UI control unit 401 passes the set content, which has been specified by a user using the setting items on the monitoring condition generation screen, to the device monitoring unit 403, and the display of the monitoring condition generation screen is terminated. The state monitoring unit 403 stores the set content passed from the UI control unit 401 in the device DB 407. Also, when a user pushes a cancel button 890, the UI control unit 401 discards the set content which has been specified by a user using the setting items on the monitoring condition generation screen, and the display of the monitoring condition generation screen is terminated.

The description is continued with reference back to FIG. 5. Based on the monitoring condition generated in step S11, the state monitoring unit 403 determines whether or not the time (monitoring start time) for commencement of monitoring the state of a device is reached (step S12). When the state monitoring unit 403 determines that the monitoring start time has not been reached, the process returns to step S12. When the state monitoring unit 403 determines that the monitoring start time has been reached, the state monitoring unit 403 executes device state monitor processing (step S13).

Figure 7:
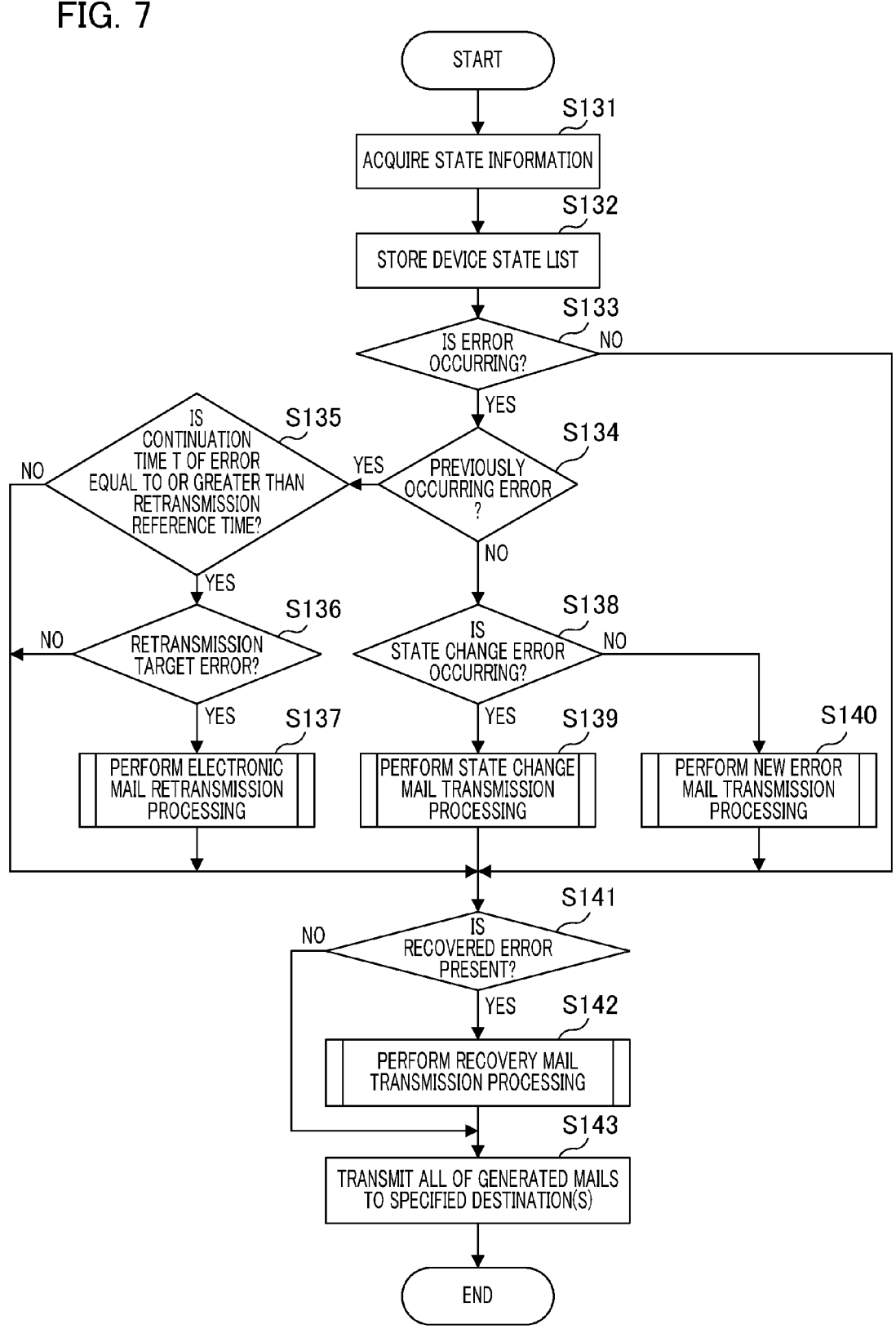
FIG. 7 is a flowchart illustrating the details of device state monitor processing.

FIG. 7 is a flowchart illustrating the details of device state monitor processing in step S13 shown in FIG. 5. Firstly, the state monitoring unit 403 acquires state information about the monitoring target device that has been specified by the monitoring target device 810 on the monitoring condition generation screen shown in FIG. 6 (step S131). The state monitoring unit 403 associates the acquired state information with a device key, and stores the resulting information as a device state list in the device DB 407 (step S132).

FIG. 8A and FIG. 8B are diagrams illustrating examples of state information and a device state list, respectively. FIG. 8A is a diagram illustrating an example of state information. The state information has data items such as a device key, an error ID, and a monitor time. The device key is identification information for uniquely identifying the device 101 corresponding to state information. In the present embodiment, the device key is the serial number of the device 101 corresponding to state information. The error ID is identification information for uniquely identifying an error occurring in the monitoring target device. The monitor time is the time at which the state monitoring unit 403 has acquired the present state information from the monitoring target device. The monitor time is a single time for each acquired state information.

FIG. 8B is a diagram illustrating an example of a device state list. The device state list has data items such as a device key, an error ID, an error occurred time, an error finally detected time, an error recovered time, the number of error mail transmission times, a transmitted mail Message-Id, and a transmitted mail Reference. The device key corresponds to the device key of the state information. The error ID corresponds to the error ID of the state information.

The error occurred time is a time at which the state monitoring unit 403 has first detected the error that has occurred in the device 101. The state monitoring unit 403 detects the occurrence of an error in the device 101 to be monitored based on the state information shown in FIG. 8. The error finally detected time is a time at which the state monitoring unit 403 has finally detected the error that has occurred in the monitoring target device. The error recovered time is a time at which the state monitoring unit 403 has detected the recovery from an error in the device 101 to be monitored. The fact that the error recovered time is left blank indicates that the corresponding error is still in the unrecovered state.

The number of error mail transmission times is the number of times the state monitoring unit 403 has transmitted an electronic mail for reporting the corresponding error to the notification destination via the electronic mail control unit 406. Each time the state monitoring unit 403 transmits an electronic mail for reporting an error to the notification destination, the state monitoring unit 403 increases the number of error mail transmission times in the device state list by one and overwrites the number thereof. The transmitted mail Message-Id and the transmitted mail References are information included in the header information of an electronic mail to be transmitted by the state monitoring unit 403.

The transmitted mail Message-Id indicates the Message-Id serving as identification information for uniquely identifying an electronic mail to be transmitted, i.e., a notification regarding the change in the state of the device 101. The transmitted mail References is the history of the notification (e.g., an electronic mail regarding an error). The transmitted mail References includes the list of Message-Ids of the past electronic mails regarding the error. In other words, the transmitted mail References is information associated with a notification (a new error mail to be described below) that has been transmitted when it is determined that the error is a newly-occurred error. Then, the device DB 407 functions as a storage unit configured to store the transmitted mail Message-Id and the transmitted mail Reference in association with each other.

Here, a description will be given by taking an example of the processing in step S132 shown in FIG. 7 with reference to the state information shown in FIG. 8A and the device state list shown in FIG. 8B. Firstly, the state monitoring unit 403 checks whether or not a component (single line of data) having the same combination as that of the device key and the error ID included in state information is present in the device state list. When a component having the same combination as that of the device key and the error ID included in state information is present, the state monitoring unit 403 sets the value of the monitor time included in state information to the error finally detected time of the component.

When a component having the same combination as that of the device key and the error ID included in state information is absent, the state monitoring unit 403 newly adds the component to the device state list. Then, the state monitoring unit 403 sets the values of the device key, the error ID, and the monitor time of state information to the device key, the error ID, and the error finally detected time of the added component, respectively. Also, the state monitoring unit 403 also sets the value of the monitor time of state information to the error occurred time of the added component.

For a component in which the error recovered time included in the device state list is left blank, the error occurring in the device 101 corresponding to the component is still in the unrecovered state. The state monitoring unit 403 determines that the error recovered time is left blank, and the device 101 corresponding to the component, in which the same combination as that of the device key and the error ID included in state information is absent, has recovered from the error. Then, the state monitoring unit 403 sets the value of the monitor time included in state information to the error recovered time of the component.

The description is continued with reference back to FIG. 7. In step S133, the state monitoring unit 403 determines whether or not an error has occurred in a monitoring target device based on the state information acquired in step S131 (step S133). More specifically, when the state monitoring unit 403 acquires one or more sets of state information, the state monitoring unit 403 determines that an error has occurred in a monitoring target device. When the state monitoring unit 403 determines that an error is not occurring in a monitoring target device, the process advances to step S141. When the state monitoring unit 403 determines that an error has occurred in a monitoring target device, the process advances to step S134.

Next, the state monitoring unit 403 determines whether or not the error occurring in a monitoring target device is the previously occurring error (step S134). More specifically, for a component in which the error recovered time included in the device state list is left blank, the state monitoring unit 403 compares the value of the error occurred time with the value of the error finally detected time.

When the value of the error occurred time is less than the value of the error finally detected time as a result of comparison of the value of the error occurred time and the value of the error finally detected time by the state monitoring unit 403, the state monitoring unit 403 determines that an error occurring in a monitoring target device is a previously occurring error. When the value of the error occurred time is equal to or greater than the value of the error finally detected time, the state monitoring unit 403 determines that an error occurring in a monitoring target device is not a previously occurring error.

When the state monitoring unit 403 determines that an error occurring in a monitoring target device is not a previously occurring error, the process advances to step S138. When the state monitoring unit 403 determines that an error occurring in a monitoring target device is a previously occurring error, the process advances to step S135.

In step S135, the state monitoring unit 403 determines whether or not the continuation time T of an error occurring in a monitoring target device is equal to or greater than a retransmission reference time. The retransmission reference time is a time that is calculated by the state monitoring unit 403 in advance based on the time specified by the electronic mail retransmission interval 860 on the monitoring condition generation screen (see FIG. 6). In other words, when it is determined that an error occurring in a device (image forming apparatus) is an error that has already occurred, the state monitoring unit 403 functions as an error continuation time determination unit configured to determine whether or not the error continues for a period of time equal to or longer than a predetermined period of time.

The state monitoring unit 403 calculates a retransmission reference time based on the following formula (1).

Retransmission reference time=the number of error mail transmission times×the electronic mail retransmission interval    Formula (1)

The term "the number of error mail transmission times" in the formula (1) is the value set in the number of error mail transmission times included in a component corresponding to the device 101 in which the error in the device state list occurs. The term "the electronic mail retransmission interval" is the time specified by the electronic mail retransmission interval 860 on the monitoring condition generation screen.

Also, the state monitoring unit 403 calculates the error continuation time T based on the following formula (2).

T=the value of the error finally detected time−the value of the error occurred time    Formula (2)

The term "the value of the error finally detected time" in the formula (2) is the value set in the error finally detected time included in a component corresponding to the device 101 in which the error in the device state list occurs. Also, the term "the value of the error occurred time" is the value set in the error occurred time included in a component corresponding to the device 101 in which the error in the device state list occurs.

When the continuation time T of an error occurring in a monitoring target device is less than the retransmission reference time, the process advances to step S141. When the continuation time T of an error occurring in a monitoring target device is equal to or greater than the retransmission reference time, the process advances to step S136.

In step S136, the state monitoring unit 403 determines whether or not an error occurring in a monitoring target device is a retransmission target error (step S136). The retransmission target error is an error which will be the target of having an electronic mail regarding the error retransmitted. More specifically, the error specified by the electronic mail retransmission setting 850 on the monitoring condition generation screen is the retransmission target error. Thus, the state monitoring unit 403 determines whether or not an error occurring in a monitoring target device is a retransmission target error based on the content specified by the electronic mail retransmission setting 850.

When the electronic mail retransmission setting 850 is a setting item that is capable of setting the propriety of the execution of the retransmission of an electronic mail for each error category and each error level, the state monitoring unit 403 determines whether or not an error occurring in a monitoring target device is a retransmission target error in the manner described below. The state monitoring unit 403 stores the error ID, the error category, and the error level of each error in advance in association with each other in a predetermined storage unit (e.g., the device DB 407). The state monitoring unit 403 acquires the error category and the error level, which correspond to the error ID of an error occurring in a monitoring target device, from the storage unit. Then, the state monitoring unit 403 refers to the set content corresponding to the acquired error category and error level from among the set contents set by the electronic mail retransmission setting 850, and determines whether or not an error occurring in a monitoring target device is a retransmission target error.

When an error occurring in a monitoring target device is not a retransmission target error, the process advances to step S141. When an error occurring in a monitoring target device is a retransmission target error, the state monitoring unit 403 executes electronic mail retransmission processing (step S137), and the process advances to step S141. Electronic mail retransmission processing is processing for retransmitting an electronic mail regarding the error.

Figure 9:
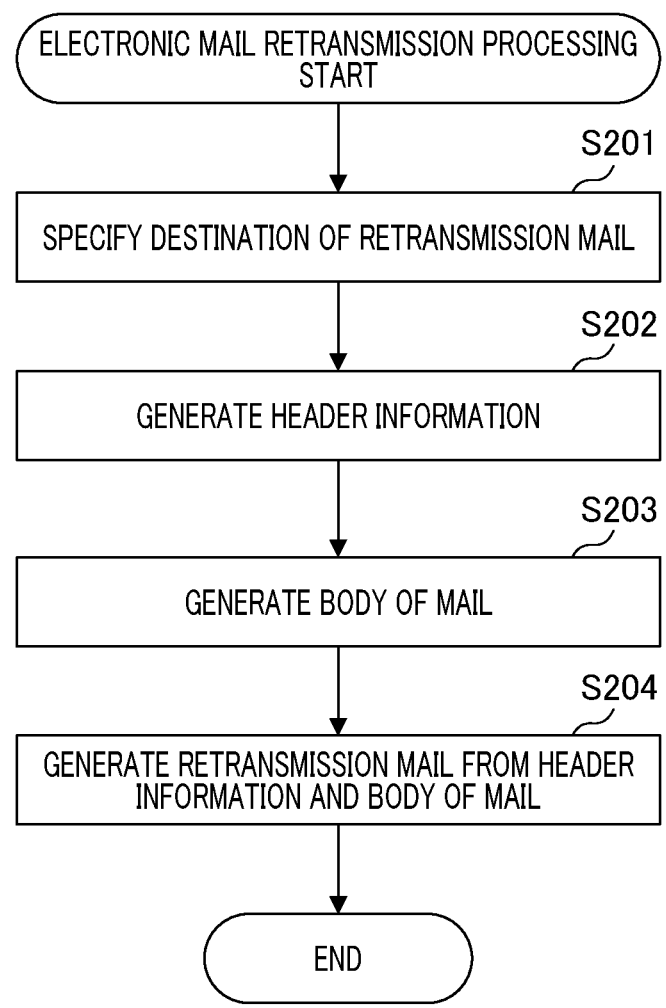
FIG. 9 is a flowchart illustrating the details of electronic mail retransmission processing.

FIG. 9 is a flowchart illustrating the details of electronic mail retransmission processing in step S137 shown in FIG. 7. Firstly, the state monitoring unit 403 specifies the destination of an electronic mail to be retransmitted (retransmission mail) (step S201). In step S201, the state monitoring unit 403 acquires the number of error mail transmission times included in a component corresponding to the device 101 in which the error in the device state list occurs. When the acquired number of error mail transmission times is, for example, "N", an electronic mail regarding the error has already been transmitted to the electronic mail transmission destinations having the first to Nth priority. Thus, in this case, the state monitoring unit 403 specifies the electronic mail transmission destination, which has been specified as the "(N+1)th priority" in the electronic mail transmission destination 870 on the monitoring condition generation screen, as the retransmission mail destination. In other words, as the error notification destination, the state monitoring unit 403 newly determines a notification destination that is different from the notification destination (new error mail destination to be described below) when it has been determined in step S134 shown in FIG. 7 that the error is the newly-occurred error.

Next, the state monitoring unit 403 generates the header information of a retransmission mail (step S202). More specifically, the state monitoring unit 403 adds a separator to the last number of the current value of the transmitted mail References included in a component corresponding to the device 101 in which the error in the device state list occurs, and adds the value of the current transmission mail Message-Id. The separator is, for example, a space character. With this arrangement, the state monitoring unit 403 newly generates the value of the transmitted mail References. Then, the state monitoring unit 403 overwrites the newly generated value of the transmitted mail References to the transmitted mail References. Also, the state monitoring unit 403 generates a unique character string as the value of the new transmission mail Message-Id, and overwrites the unique character string to the transmitted mail Message.

The overwritten value of the transmitted mail reference is the history of the identification information about an electronic mail regarding an error that has occurred in the device 101. The state monitoring unit 403 stores the history of the identification information about the electronic mail and the number of error mail transmission times in association with each other in the device state list.

Next, the state monitoring unit 403 generates the header information of an electronic mail using the overwritten transmission mail Message-Id and transmission mail References. More specifically, the state monitoring unit 403 assigns the value of the transmitted mail Message-Id to the Message-Id field of the header portion of an electronic mail. Also, the state monitoring unit 403 assigns the value of the transmitted mail References to the References field of the header portion of an electronic mail. Next, the state monitoring unit 403 refers to the message list stored in the device DB 407 in advance, and generates a body of an electronic mail (step S203).

FIG. 10 is a diagram illustrating an example of an error message list. The message list has data items such as an error ID, an error category, an error level, an error message, and a recovery message. The error ID is identification information for uniquely identifying an error which may occur in a monitoring target device. The error category is the type of an error. The error level is the degree of importance of an error. The error message is a message to be described in the body of an electronic mail regarding the error. The recovery message is a message to be described in the body of an electronic mail that is to be transmitted after having recovered from the error.

In step S203 shown in FIG. 9, the state monitoring unit 403 acquires an error ID included in a component corresponding to, for example, the device 101 in which the error in the device state list occurs. The state monitoring unit 403 refers to the error message list, and extracts the error message corresponding to the acquired error ID. Then, the state monitoring unit 403 inserts the extracted error message into the body of an electronic mail. Note that the state monitoring unit 403 may insert not only an error message but also an error ID, an error category, and an error level into the body of an electronic mail. Also, the state monitoring unit 403 may insert various information about a monitoring target device (e.g., device list information shown in FIG. 4B) into the body of an electronic mail.

Next, the state monitoring unit 403 connects the header information of the electronic mail generated in step S202 to a body of the electronic mail generated in step S203. With this arrangement, the state monitoring unit 403 generates a retransmission mail (step S204). Then, in step S143 shown in FIG. 7 to be described below, the state monitoring unit 403 instructs the electronic mail control unit 406 to transmit the retransmission mail to the destination specified in step S201. With this arrangement, the electronic mail control unit 406 transmits a notification regarding an error (retransmits an electronic mail regarding an error) to the notification destination determined by the state monitoring unit 403.

The description is continued referring back to FIG. 7. In step S138, the state monitoring unit 403 determines whether or not a state-change error occurs based on the device state list and the message list (step S138). The state-change error is an error in which the state of the error that has occurred in the past in the device 101 to be monitored has changed. In the present embodiment, the error that occurred in the past and is prior to the change in the state thereof is referred to as a "prior state-change error". In other words, when the state monitoring unit 403 determines that an error occurring in the device 101 to be monitored is not the already-occurred error (No in step S134), the state monitoring unit 403 determines whether or not the occurring error is an error in which the state of the already-occurred error has changed.

When the state monitoring unit 403 determines that a no state-change error occurs, the state monitoring unit 403 determines that an error occurring in a monitoring target device is the newly-occurred error, and executes new error mail transmission processing (step S140). In other words, the state monitoring unit 403 functions as an error occurrence determination unit configured to determine whether an error occurring in the device 101 is the already-occurred error (Yes in step S134) or the newly-occurred error (No in step S138) based on the change in the state of the device 101. The new error mail is an electronic mail for reporting the newly-occurred error in a monitoring target device. When the state monitoring unit 403 determines that a state-change error has occurred, the state monitoring unit 403 executes state change mail transmission processing (step S139).

An example of processing in step S138 will be specifically described. In the device state list shown in FIG. 8B, attention is given to a component (hereinafter referred to as a "first element") for which the device key is ABC123 and the error ID is ID-0002. In other words, it is assumed that an error having the error ID of ID-0002 occurs in the device 101 corresponding to the device key of "ABC123".

Firstly, the state monitoring unit 403 acquires the value of the error finally detected time of the first element. In this example, the state monitoring unit 403 acquires the value of "20xx/01/01 15:00". Next, the state monitoring unit 403 extracts a component of which the value of the error recovered time is the same as the value of "20xx/01/01 15:00" and the value of the device key is the same "ABC123" as that of the first element. In this example, the state monitoring unit 403 extracts a component (hereinafter referred to as a "second element") having the device key of ABC123 and the error ID of ID-0001.

Next, the state monitoring unit 403 refers to the message list, and determines whether or not an error corresponding to the error ID of "ID-0002" of the first element is a state-change error. In this example, when an error category corresponding to the error ID of the first element is the same as that corresponding to the error ID of the second element, the state monitoring unit 403 determines that an error corresponding to the error ID of the first element is a state-change error.

Referring to the message list shown in FIG. 10, both the error category corresponding to the error ID of "ID-0002" of the first element and the error category corresponding to the error ID of "ID-0002" of the second element are "toner". Thus, the state monitoring unit 403 determines that an error corresponding to the error ID of "ID-0002" of the first element, i.e., the error occurring in the device 101 to be monitored is a state-change error. Note that an error corresponding to the error ID of "ID-0002" of the second element is a prior state-change error.

Figure 11:
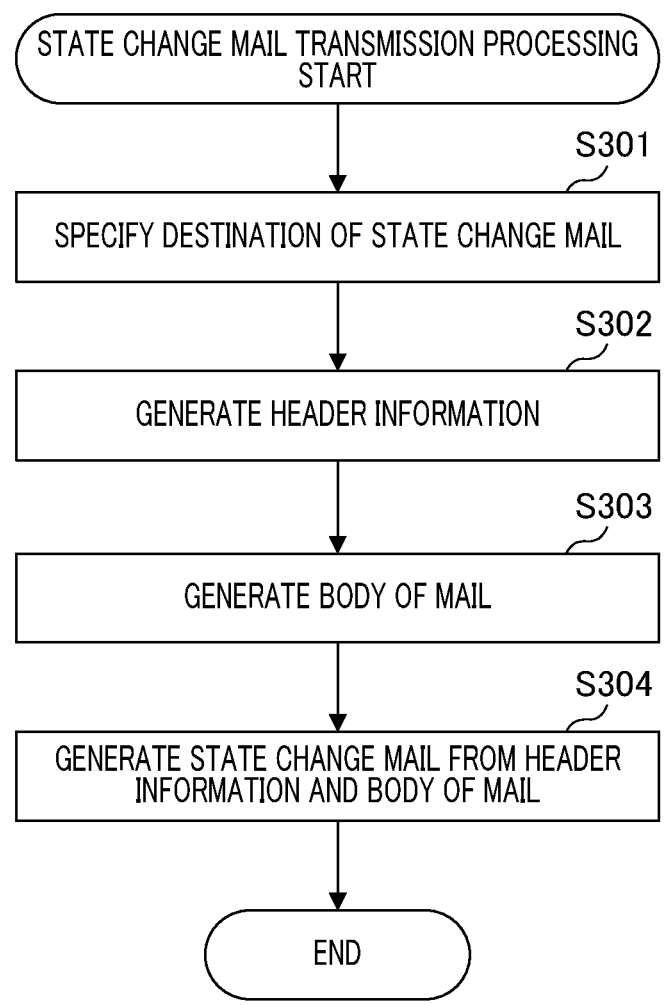
FIG. 11 is a flowchart illustrating state change electronic mail transmission processing.

FIG. 11 is a flowchart illustrating state change mail transmission processing. Hereinafter, a description will be given of state change mail transmission processing in step S139 shown in FIG. 7 with reference to FIG. 11. A state-change mail is an electronic mail for reporting the occurrence of a state-change error. Firstly, the state monitoring unit 403 specifies the destination of a state-change mail (step S301).

Since a state-change error to be reported by a state-change mail is an error in which the state of the error occurred in the past in a monitoring target device has changed, the state-change error firstly needs to be reported to the destination with the first priority. Thus, the state monitoring unit 403 specifies the electronic mail transmission destination, which has been specified as the "first priority" in the electronic mail transmission destination 870 on the monitoring condition generation screen, as the state-change mail destination. In this example, the state-change mail destination to be specified by the state monitoring unit 403 is the same as the new error mail destination to be specified in step S401 shown in FIG. 12 to be described below. Note that the state monitoring unit 403 may transmit a state-change mail to a destination other than the electronic mail transmission destination specified as the "first priority", i.e., a destination different from the new error mail destination.

Next, the state monitoring unit 403 generates the header information of a state-change mail (step S302). A description will be given by taking an example of a case where a state-change error to be reported by a state-change mail is an error corresponding to a component (first element) having the device key of ABC123 and the error ID of ID-0002 in the device state list shown in FIG. 8B.

The state-change error is an error in which the state of an error corresponding to the component (second element), for which the device key is ABC123 and the error ID is ID-0001 in the device state list shown in FIG. 8B, has changed. Thus, the state monitoring unit 403 sets the value of the transmitted mail Message-Id of the second element to the transmitted mail References of the first element in the device state list. Also, the state monitoring unit 403 sets a unique character string in the transmitted mail Message-Id of the first element. Then, the state monitoring unit 403 assigns the value of the transmitted mail Message-Id of the first element to the Message-Id field of the header portion of a state-change mail.

Also, the state monitoring unit 403 assigns the value of the transmitted mail References of the first element to the References field of the header portion of a state-change mail. Processing for generating a body of a state-change mail in step S303 and processing for generating a state-change mail in step S304 are the same as processing in step S203 and processing in step S204 shown in FIG. 9, respectively. As described above, when the state monitoring unit 403 determines that the occurring error is a state-change error, the state monitoring unit 403 transmits a state-change mail as a new electronic mail to a predetermined notification destination. The state monitoring unit 403 transmits a state-change mail to a notification destination, whereby the notification destination is informed of the fact that the state of the error that has occurred in the device 101 has changed.

Figure 12:
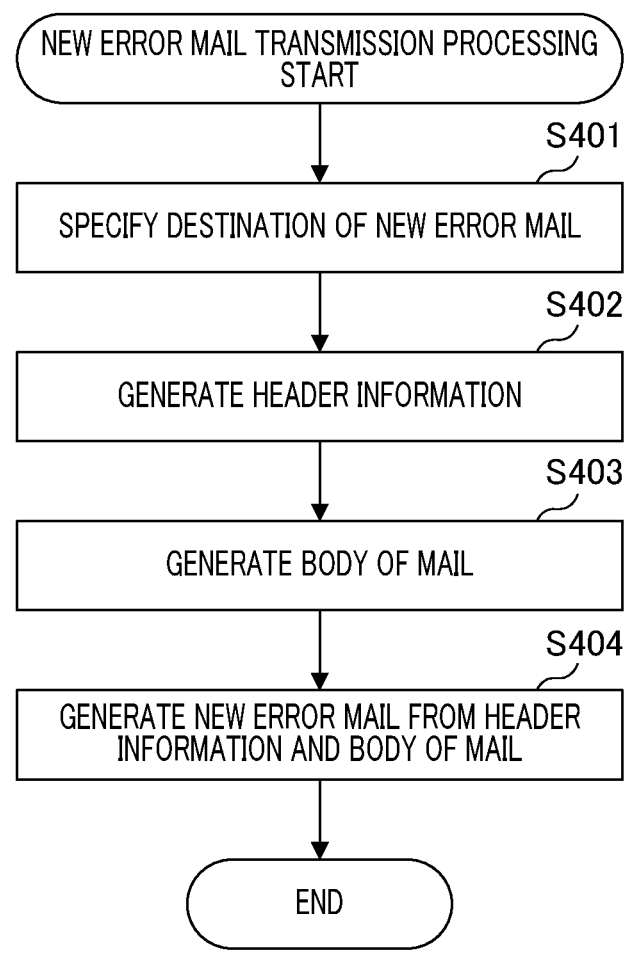
FIG. 12 is a flowchart illustrating new error mail transmission processing.

FIG. 12 is a flowchart illustrating new error mail transmission processing. Hereinafter, a description will be given of new error mail transmission processing in step S140 shown in FIG. 7 with reference to FIG. 12. The state monitoring unit 403 specifies a new error mail destination (step S401). More specifically, the state monitoring unit 403 specifies the electronic mail transmission destination, which has been specified as the "first priority" in the electronic mail transmission destination 870 on the monitoring condition generation screen, as the new error mail destination.

Next, the state monitoring unit 403 generates the header information of a new error mail (step S402). More specifically, the state monitoring unit 403 sets a unique character string in the transmitted mail Message-Id of a component corresponding to the error to be reported by the new error mail in the device state list. The state monitoring unit 403 does not set information in the transmitted mail References 1108 of the component. Then, the state monitoring unit 403 assigns the value of the transmitted mail Message-Id of the component to the Message-Id field of the header portion of a new error mail. Processing for generating a body of a new error mail in step S403 and processing for generating a new error mail in step S404 are the same as processing in step S203 and processing in step S204 shown in FIG. 9, respectively.

The description is continued referring back to FIG. 7. In step S141, the state monitoring unit 403 determines whether or not a recovered error is present based on the state information (see FIG. 8A) and the device state list (see FIG. 8B) (step S141). The recovered error is an error from which a monitoring target device has recovered. More specifically, the state monitoring unit 403 extracts a component (hereinafter referred to as an "error recovery component"), which corresponds to the error recovered time equal to the monitor time included in state information, from the device state list. The state monitoring unit 403 determines that an error corresponding to the extracted error recovery component is a recovered error in the device 101 corresponding to the error recovery component.

For example, when the monitor time included in state information is "20xx/01/01 13:00", the state monitoring unit 403 extracts a component, for which the device key is "DEF456" and the error ID is "ID-0010", as an error recovery component from the device state list shown in FIG. 8B. Then, the state monitoring unit 403 determines that an error having the error ID of "ID-0010" is a recovered error. It should be noted that the state monitoring unit 403 does not determine that a component corresponding to a prior state-change error is an error recovery component even if the component corresponds to an error recovered time equivalent to the monitor time included in state information. In other words, the state monitoring unit 403 functions as an error recovery determination unit configured to determine whether or not recovery from an error that has occurred in the device 101 to be monitored has been accomplished based on the change in the state of the monitoring target device (image forming apparatus) 101.

When the state monitoring unit 403 determines that a recovered error is absent, the process advances to step S143. When the state monitoring unit 403 determines that a recovered error is present, the state monitoring unit 403 executes recovery mail transmission processing (step S142). The recovery mail is an electronic mail for reporting a recovered error.

Figure 13:
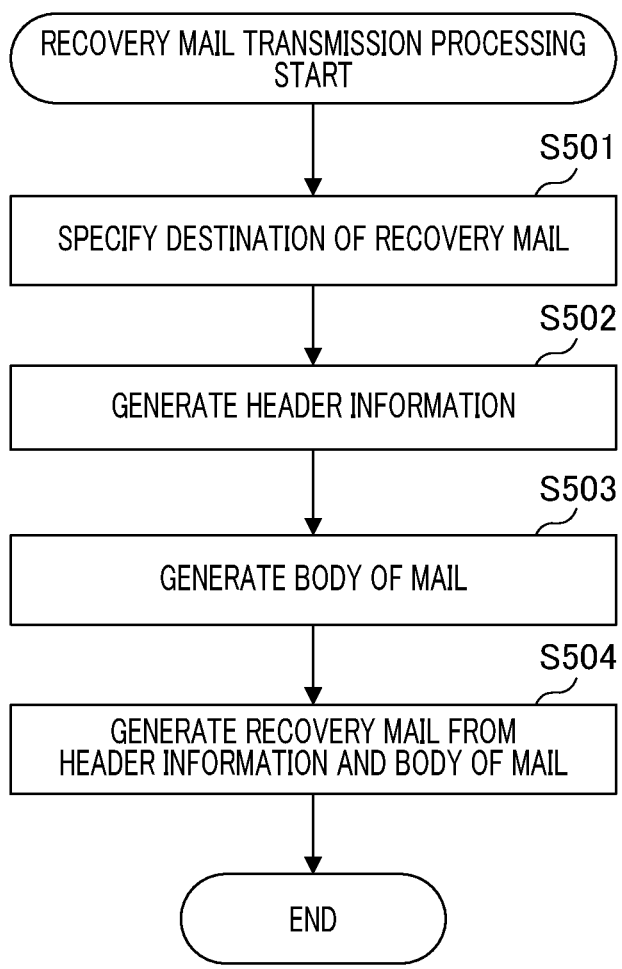
FIG. 13 is a flowchart illustrating the details of recovery mail transmission processing.

FIG. 13 is a flowchart illustrating the details of recovery mail transmission processing. Hereinafter, a description will be given of recovery mail transmission processing in step S142 shown in FIG. 7 with reference to FIG. 13. The state monitoring unit 403 specifies an error recovery notification destination, i.e., a recovery mail destination depending on the history of an electronic mail regarding the error (step S501). Here, an electronic mail regarding the error includes a retransmission mail, a state-change mail, and a new error mail.

Hereinafter, a specific description will be given of processing in step S401. The state monitoring unit 403 reads the value of the transmitted mail References of a component (error recovery component) corresponding to a recovered error from the device state list. Next, the state monitoring unit 403 delimits the value of the read transmission mail References for each separator (e.g., space character) to thereby generate one or a plurality of character strings. Since the generated character string is a character string that has been employed as the Message-Id of an electronic mail regarding an error prior to recovery in the past, the character string indicates the history of identification information about an electronic mail regarding an error prior to recovery. In other words, the state monitoring unit 403 acquires the history of identification information about an electronic mail regarding an error prior to recovery from the device state list.

Next, the state monitoring unit 403 extracts a component having the transmitted mail Message-Id or the transmitted mail References, which coincides with the generated character string, from the device state list. The state monitoring unit 403 reads the value of the number of error mail transmission times for each of the extracted components. Among the number of error mail transmission times read by the state monitoring unit 403, the maximum number of transmission times is assumed to be "N".

The fact that the maximum number of transmission times is "N" means that an electronic mail regarding an error prior to recovery has already been transmitted to the destinations from the first priority to the Nth priority. Thus, the state monitoring unit 403 specifies the electronic mail transmission destinations, which are specified from the "first priority" to "Nth priority" in the electronic mail transmission destination 870 on the monitoring condition generation screen, as the recovery mail destinations. In other words, the state monitoring unit 403 acquires the electronic mail transmission times corresponding to identification information about the electronic mails included in the history of identification information about an electronic mail regarding the occurring error, and determines and specifies an error recovery notification destination based on the transmission times of the acquired electronic mail.

In other words, the state monitoring unit 403 determines the notification destination, to which a notification regarding an error that has occurred has been transmitted, based on the transmitted mail Reference corresponding to identification information (transmission mail Message-Id) about an electronic mail regarding the error that has occurred. Then, the state monitoring unit 403 sets the determined notification destination to the notification destination of a notification regarding an error recovery. With this arrangement, the state monitoring unit 403 determines the notification destination, to which a notification regarding the error that has occurred has been transmitted, as the notification destination of a notification regarding an error recovery. Consequently, the state monitoring unit 403 is capable of transmitting a recovery mail to the destination of an electronic mail regarding an error prior to recovery without exception.

Next, the state monitoring unit 403 generates the header information for a recovery mail (step S502). As recovery mail header information generation processing is the same as retransmission mail header information generation processing in step S202 shown in FIG. 9, explanation thereof will be omitted.

Next, the state monitoring unit 403 generates a body of a recovery mail (step S503). More specifically, the state monitoring unit 403 extracts a recovery message corresponding to the error ID of an error recovery component from the message list, and inserts the extracted recovery message into the body of a recovery mail. Note that the state monitoring unit 403 may extract the error category, the error level, and the like, which correspond to the error ID of the error recovery component, from the message list, and insert the extracted error category, error level, and the like into the body. Also, the state monitoring unit 403 may insert various information (device list information or the like) about the device 101, which corresponds to an error recovery component, into a body. Recovery mail generation processing in step S504 is the same as processing in step S204 shown in FIG. 9.

The description is continued referring back to FIG. 7. The state monitoring unit 403 transmits all mails, which have been generated in steps S137, S139, S140, and S142, to the specified destination (step S143). More specifically, the state monitoring unit 403 instructs the electronic mail control unit 406 to transmit a retransmission mail to the destination specified in step S201 shown in FIG. 9. Also, the state monitoring unit 403 instructs the electronic mail control unit 406 to transmit a state-change mail to the destination specified in step S301 shown in FIG. 11.

Also, the state monitoring unit 403 instructs the electronic mail control unit 406 to transmit a new error mail to the destination specified in step S401 shown in FIG. 12. Furthermore, the state monitoring unit 403 instructs the electronic mail control unit 406 to transmit a recovery mail to the destination specified in step S501 shown in FIG. 13. The electronic mail control unit 406 transmits a recovery mail to the determined destination.

According to the management apparatus of the present embodiment described above, when an error that has occurred in the image forming apparatus is overlooked for a predetermined time, the management apparatus is capable of retransmitting an electronic mail regarding an error to a notification destination with the notification destination being changed. Thus, an error that has occurred in the image forming apparatus may be prevented from being overlooked for a long time. Also, according to the management apparatus of the present embodiment, after recovering from the error that has occurred in the image forming apparatus, the apparatus is capable of transmitting each notification destination, to which an electronic mail regarding the error has been reported, to an error recovery mail without exception.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-226006 filed Oct. 5, 2010, which is hereby incorporated by reference herein in its entirety.

What is claimed is:

1. A management apparatus that monitors a plurality of image forming apparatuses on a network, the management apparatus comprising:
   a screen connected to a graphical user interface (GUI) unit to accept error monitoring and reporting configurations;
   a state acquisition unit configured to acquire the state of each image forming apparatus;
   a monitoring unit configured to monitor the change in state of each image forming apparatus based on the acquired state of the respective image forming apparatus;
   a determination unit configured to determine a GUI configurable notification destination to which the change in the states is to be reported depending on the monitor result of the change in the state of the image forming apparatus by means of the monitoring unit; and
   a transmission unit configured to transmit a notification regarding the change in the state to the notification destination determined by the determination unit,
   wherein the monitoring unit further comprises:

an error occurrence determination unit configured to determine whether an error occurring in the image forming apparatus is an already-occurred error or a newly-occurred error based on the state of the image forming apparatus acquired by the state acquisition unit;

an error continuation time determination unit configured to determine whether or not the occurring error continues for a period of time equal to or longer than a predetermined period of time when the error occurrence determination unit has determined that the occurring error is the already-occurred error; and an error recovery determination unit configured to determine whether or not the image forming apparatus recovered from an error that occurred therein based on the state of the image forming apparatus acquired by the state acquisition unit, wherein, as to the notification destination, when the error continuation time determination unit has determined that the occurring error continues for a period of time equal to or longer than a predetermined period of time, the determination unit newly determines a GUI configurable notification destination that is different from the notification destination when the error occurrence determination unit has determined that the error is a newly-occurred error, wherein error notification and monitoring times and intervals are GUI configurable, wherein, when the error continuation time determination unit has determined that the occurring error continues for a period of time equal to or longer than a predetermined period of time, the transmission unit transmits a notification regarding the error to the notification destination determined by the determination unit, wherein, as to the notification destination, when the error recovery determination unit has determined that the image forming apparatus has recovered from an error that occurred therein, the determination unit determines a GUI configurable notification destination to which a notification regarding the error that has occurred has been transmitted, and wherein, when the error recovery determination unit has determined that the image forming apparatus has recovered from an error that occurred therein, the transmission unit transmits a notification regarding the recovery from the error to the notification destination determined by the determination unit.

2. The management apparatus according to claim 1, wherein, when the error continuation time determination unit has determined that the occurring error continues for a period of time equal to or longer than a predetermined period of time, a notification regarding the error, which is transmitted to the notification destination determined by the determination unit by means of the transmission unit, includes information regarding the notification that has been transmitted when the error occurrence determination unit has determined that the error is a newly-occurred error.

3. The management apparatus according to claim 1, wherein the error occurrence determination unit determines whether or not an error occurring in the image forming apparatus is the changed state of an already-occurred error, wherein, as to the notification destination, when the error occurrence determination unit has determined that an error occurring in the image forming apparatus is the changed state of the already-occurred error, the determination unit determines the same notification destination as when the error occurrence determination unit has determined that an error occurring in the image forming apparatus is the newly-occurred error, and wherein, when the error occurrence determination unit has determined that an error occurring in the image forming apparatus is the changed state of the already-occurred error, the transmission unit transmits a notification regarding the error to the notification destination determined by the determination unit.

4. The management apparatus according to claim 3, wherein, when the error occurrence determination unit has determined that an error occurring in the image forming apparatus is the changed state of an already-occurred error, a notification regarding the error, which is transmitted to the notification destination determined by the determination unit by means of the transmission unit, includes information regarding the notification that has been transmitted when the error occurrence determination unit has determined that the error is a newly-occurred error.

5. The management apparatus according to claim 1, further comprising:

a storage unit configured to store identification information about a notification regarding the change in the state and a notification history in association with each other, wherein, when the error recovery determination unit has determined that the image forming apparatus has recovered from an error that occurred therein, the determination unit determines a notification destination to which a notification regarding the occurring error has been transmitted based on the notification history corresponding to identification information about a notification regarding the error stored in the storage unit, and sets the determined notification destination to the notification destination to which a notification regarding the recovery from the error is to be made.

6. The management apparatus according to claim 1, wherein a notification regarding the change in the state by means of the transmission unit is an electronic mail.

7. A method for controlling a management apparatus that monitors a plurality of image forming apparatuses on a network, using a screen connected to a graphical user interface (GUI) unit to accept error monitoring and reporting configurations, the method comprising:

acquiring, in a state acquisition step, the state of each image forming apparatus;

monitoring, in a monitoring step, the change in the state of each image forming apparatus based on the acquired state of the respective image forming apparatus;

determining, in a determination step, a GUI configurable notification destination to which the change in the state is to be reported depending on the monitor result of the change in the state of the image forming apparatus in the monitoring step; and transmitting, in a transmission step, a notification regarding the change in the state to the notification destination determined in the determination step, wherein the monitoring step further comprises:

determining, in an error occurrence determination step, whether an error occurring in the image forming apparatus is an already-occurred error or a newly-occurred error based on the state of the image forming apparatus acquired in the state acquisition step;

determining, in an error continuation time determination step, whether or not the occurring error continues for a period of time equal to or longer than a predetermined period of time when it is determined in the error occurrence determination step that the occurring error is the already-occurred error; and determining, in an error recovery determination step, whether or not the image forming apparatus has recovered from an error that occurred therein based on the state of the image forming apparatus acquired in the state acquisition step, wherein, as to the notification destination, when it is determined in the error continuation time determination step that the occurring error continues for a period of time equal to or longer than a predetermined period of time, determining, in the determination step, a new GUI configurable notification destination that is different from the notification destination when it is determined in the error occurrence determination step that the error is the newly-occurred error, wherein error notifications and monitoring times and intervals are GUI configurable, wherein, when it is determined in the error continuation time determination step that the occurring error continues for a period of time equal to or longer than a predetermined period of time, transmitting, in the transmission step, a notification regarding the error to the notification destination determined in the determination step, wherein, as to the notification destination, when it is determined in the error recovery determination step that the image forming apparatus has recovered from an error that occurred therein, determining, in the determination step, a GUI configurable notification destination to which a notification regarding the error that has occurred has been transmitted, and wherein, when it is determined in the error recovery determination step that the image forming apparatus has recovered from an error that occurred therein, transmitting, in the transmission step, a notification regarding the recovery from the error to the notification destination determined in the determination step.

8. The controlling method according to claim 7, wherein it is determined in the error occurrence determination step whether or not an error occurring in the image forming apparatus is the changed state of the already-occurred error, wherein, as to the notification destination, when it has been determined in the error occurrence determination step that an error occurring in the image forming apparatus is the changed state of the already-occurred error, determining, in the determination step, the same notification destination as when it has been determined in the error occurrence determination step that an error occurring in the image forming apparatus is the newly-occurred error, and wherein, when it has been determined in the error occurrence determination step that an error occurring in the image forming apparatus is the changed state of the already-occurred error, transmitting, in the transmission step, a notification regarding the error to the notification destination determined in the determination step.

9. A non-transitory computer-readable storage medium storing an executable program for causing a computer to execute a method for controlling a management apparatus that monitors a plurality of image forming apparatuses on a network, using a screen connected to a graphical user interface (GUI) unit to accept error monitoring and reporting configurations, the method comprising:

acquiring, in a state acquisition step, the state of each image forming apparatus;

monitoring, in a monitoring step, the change in the state of each image forming apparatus based on the acquired state of the respective image forming apparatus;

determining, in a determination step, a GUI configurable notification destination to which the change in the state is to be reported depending on the monitor result of the change in the state of the image forming apparatus in the monitoring step; and transmitting, in a transmission step, a notification regarding the change in the state to the notification destination determined in the determination step, wherein the monitoring step further comprises:

determining, in an error occurrence determination step, whether an error occurring in the image forming apparatus is an already-occurred error or a newly-occurred error based on the state of the image forming apparatus acquired in the state acquisition step;

determining, in an error continuation time determination step, whether or not the occurring error continues for a period of time equal to or longer than a predetermined period of time when it is determined in the error occurrence determination step that the occurring error is the already-occurred error; and determining, in an error recovery determination step, whether or not the image forming apparatus has recovered from an error that occurred therein based on the state of the image forming apparatus acquired in the state acquisition step, wherein, as to the notification destination, when it is determined in the error continuation time determination step that the occurring error continues for a period of time equal to or longer than a predetermined period of time, the determination step newly determines a GUI configurable notification destination that is different from the notification destination when it is determined in the error occurrence determination step that the error is the newly-occurred error, wherein error notifications and monitoring times and intervals are GUI configurable, wherein, when it is determined in the error continuation time determination step that the occurring error continues for a period of time equal to or longer than a predetermined period of time, transmitting, in the transmission step, a notification regarding the error to the notification destination determined in the determination step, wherein, as to the notification destination, when it is determined in the error recovery determination step that the image forming apparatus has recovered from an error that occurred therein, determining, in the determination step, a GUI configurable notification destination to which a notification regarding the error that has occurred has been transmitted, and wherein, when it is determined in the error recovery determination step that the image forming apparatus has recovered from an error that occurred therein, transmitting, in the transmission step, a notification regarding the recovery from the error to the notification destination determined in the determination step.

* * * * *